(12) United States Patent
Wakitani et al.

(10) Patent No.: US 6,968,265 B2
(45) Date of Patent: Nov. 22, 2005

(54) TRAVEL CONTROL METHOD OF ELECTRIC VEHICLE

(75) Inventors: Tsutomu Wakitani, Wako (JP); Norikazu Shimizu, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 10/949,912

(22) Filed: Sep. 24, 2004

(65) Prior Publication Data
US 2005/0090949 A1 Apr. 28, 2005

(30) Foreign Application Priority Data
Oct. 28, 2003 (JP) .............................. 2003-367730

(51) Int. Cl.⁷ ............................................. G06F 19/00
(52) U.S. Cl. ................ 701/50; 701/1; 701/3; 180/65.1; 180/65.6; 180/19.1
(58) Field of Search .................. 701/1, 36, 50, 701/112, 102, 113, 110; 477/2, 3, 4, 203; 180/65.1–65.8, 180/19.1–19.3; 37/347, 348, 466, 244–246

(56) References Cited

U.S. PATENT DOCUMENTS

| | | | |
|---|---|---|---|
| 4,351,405 A | * | 9/1982 | Fields et al. ............... 180/65.2 |
| 6,554,088 B2 | * | 4/2003 | Severinsky et al. ........ 180/65.2 |
| 6,564,481 B2 | * | 5/2003 | Wakitani et al. ............. 37/348 |
| 6,724,165 B2 | * | 4/2004 | Hughes ...................... 318/376 |
| 2002/0062583 A1 | * | 5/2002 | Wakitani et al. ............. 37/246 |

FOREIGN PATENT DOCUMENTS

JP             02142309         5/2002

* cited by examiner

Primary Examiner—Richard M. Camby
(74) Attorney, Agent, or Firm—Adams & Wilks

(57) ABSTRACT

In a travel control method for an electric vehicle having first and second electric motors for driving respective first and second driven wheels, a speed of each of the first and second electric motors is calculated. The speed of the first electric motor is reduced to equal the speed of the second electric motor when the speed of the first electric motor is higher than the speed of the second electric motor. Reduction of the speed of the first electric motor is not carried out when a first condition, in which a difference between the speeds of the first and second electric motors is below a first preselected threshold value, and a second condition, in which the speed of the first electric motor is below a second preselected threshold value identical or substantially equal to a low speed range of the electric vehicle, are met.

16 Claims, 13 Drawing Sheets

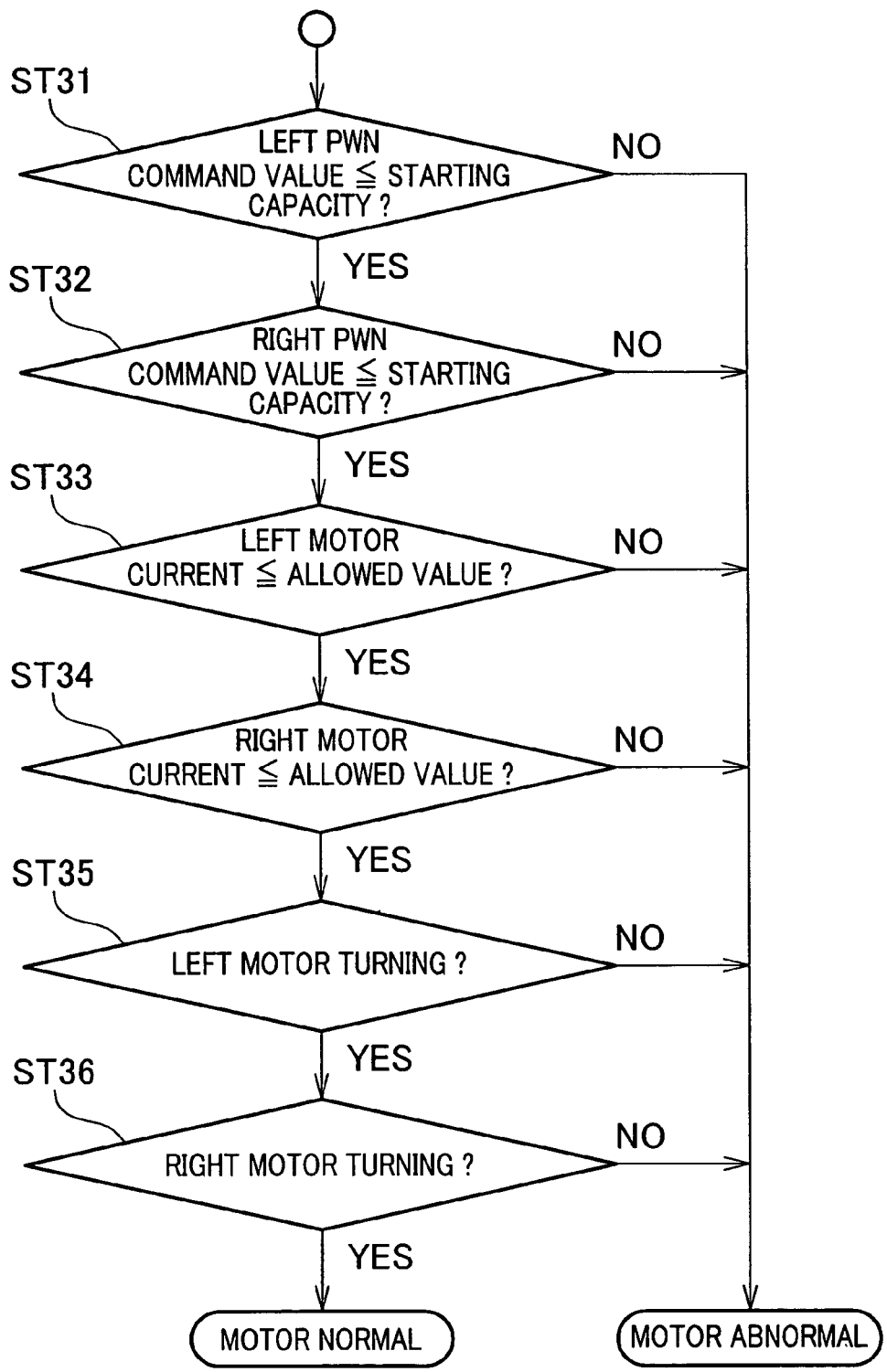

TRAVEL CONTROL METHOD OF ELECTRIC VEHICLE

FIELD OF THE INVENTION

The present invention relates to a travel control method of an electric vehicle having left and right electric motors for driving left and right drive wheels and left and right brakes for regulating the speeds of the left and right drive wheels.

BACKGROUND OF THE INVENTION

This kind of electric vehicle has left and right electric motors for individually driving left and right drive wheels, left and right brakes for individually regulating the speeds of the left and right drive wheels, and a control part for controlling the speeds of the left and right electric motors.

A travel control method of an electric vehicle in which when the brake percentages of left and right brakes operated by a driver are essentially the same the control part reads in the speeds of the left and right electric motors and reduces the speed of the electric motor at the higher speed to match it to the speed of the electric motor at the lower speed is proposed for example in JP-A-2002-142309.

Normally, in normal travel without the brakes applied, the left and right brake percentages are both zero, and the left and right brake percentages are thus the same. When at this time an influence of irregularities in the road surface causes a load to act on one of the electric motors, its speed falls and there is a possibility of the vehicle turning. However, in the control method mentioned above, because the speed of the electric motor at the higher speed is lowered to match the speed of the electric motor at the lower speed, the electric vehicle can continue to travel in a straight line.

However, on starting, when the electric vehicle shifts from a stopped state to an advancing or reversing state, if the control described above is implemented notwithstanding that the speeds of the left and right electric motors are very low, their speeds do not readily increase, and it takes time for the desired speed to be reached. And because the desired speed is generally a working speed, this means that it takes time to shift to a working state, and consequently work efficiency falls.

Thus there has been a need for the desired speed to be reached more rapidly on starting of an electric vehicle.

SUMMARY OF THE INVENTION

The present invention provides a travel control method of an electric vehicle including a step of individually regulating with left and right brakes the speeds of left and right drive wheels individually driven by means of left and right electric motors and a step of, when brake percentages of the left and right brakes are essentially the same, reading in the speeds of the left and right electric motors and performing control so as to reduce the speed of an electric motor being rotated at a higher speed to match the speed of the electric motor being rotated at the higher speed to the speed of the other electric motor being rotated at a lower speed, characterized in that, in this control, speed-reduction processing is carried out when the speed of the motor at the higher speed is above a preset threshold value.

Thus, in this invention, speed-reduction control is implemented when the speed of the electric motor at the higher speed is above a preset motor speed threshold value. That is, speed-reduction control is not carried out in a very low speed range of from immediately after starting to when the motor speed threshold value is reached. Although there is a possibility of a small amount of turning occurring, the electric motors can be raised to a predetermined speed rapidly. Because the time from immediately after starting to when the motor speed threshold value is reached is short and is passed entirely at very low speed, even if turning occurs the amount of that turning is small and can be easily rectified in subsequent normal travel, and so it causes no practical problem.

In this speed-reduction control, preferably, even when the speed of the motor rotating at the higher speed is below the preset threshold value, it is checked whether or not this electric motor is normal, and if it is not normal then speed-reduction processing is carried out.

When speed-reduction control is carried out, if an electric motor fails and stops suddenly, there is a risk of the vehicle turning suddenly. To avoid this, even when the speed of the motor at the higher speed is below the preset motor speed threshold value, it is checked whether or not this electric motor at the higher speed is normal when speed-reduction control is executed, whereby even if failure of the electric motor occurs the vehicle is slowed down and brought to a stop swiftly.

BRIEF DESCRIPTION OF THE DRAWINGS

A number of preferred embodiments of the invention will be described in detail below on the basis of the accompanying drawings, in which:

FIG. 8 is a subroutine for actually executing steps ST22L and ST22R in FIG. 7D;

DETAILED DESCRIPTION OF THE PREFERRED EMBODIMENTS

Figure 1:
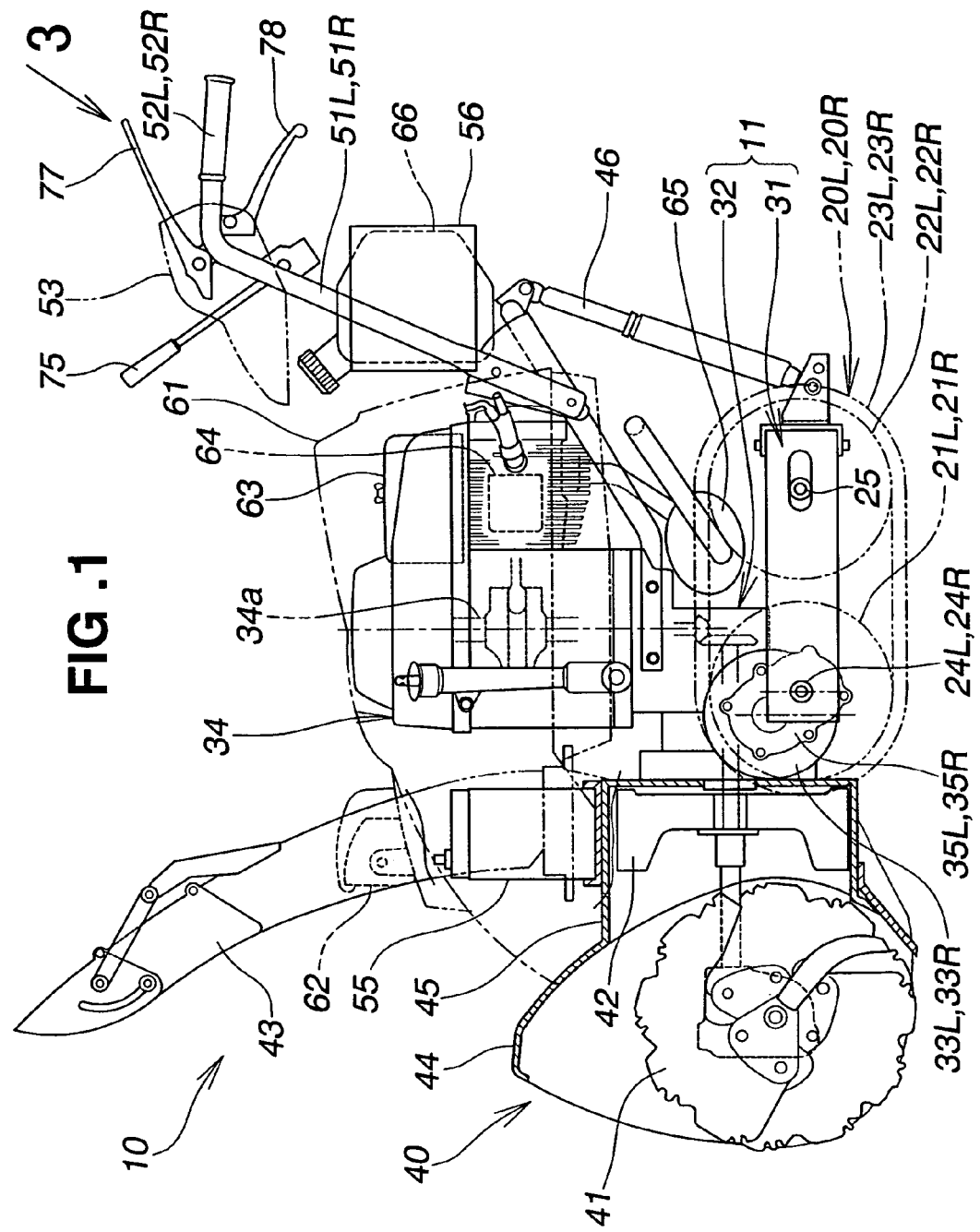
FIG. 1 is a left side view of a snow-remover according to the invention.

A preferred embodiment of a travel control method of an electric vehicle will now be described, and as a suitable embodiment of an electric vehicle the example of a snow-remover will be used, as shown in the drawings.

Figure 2:
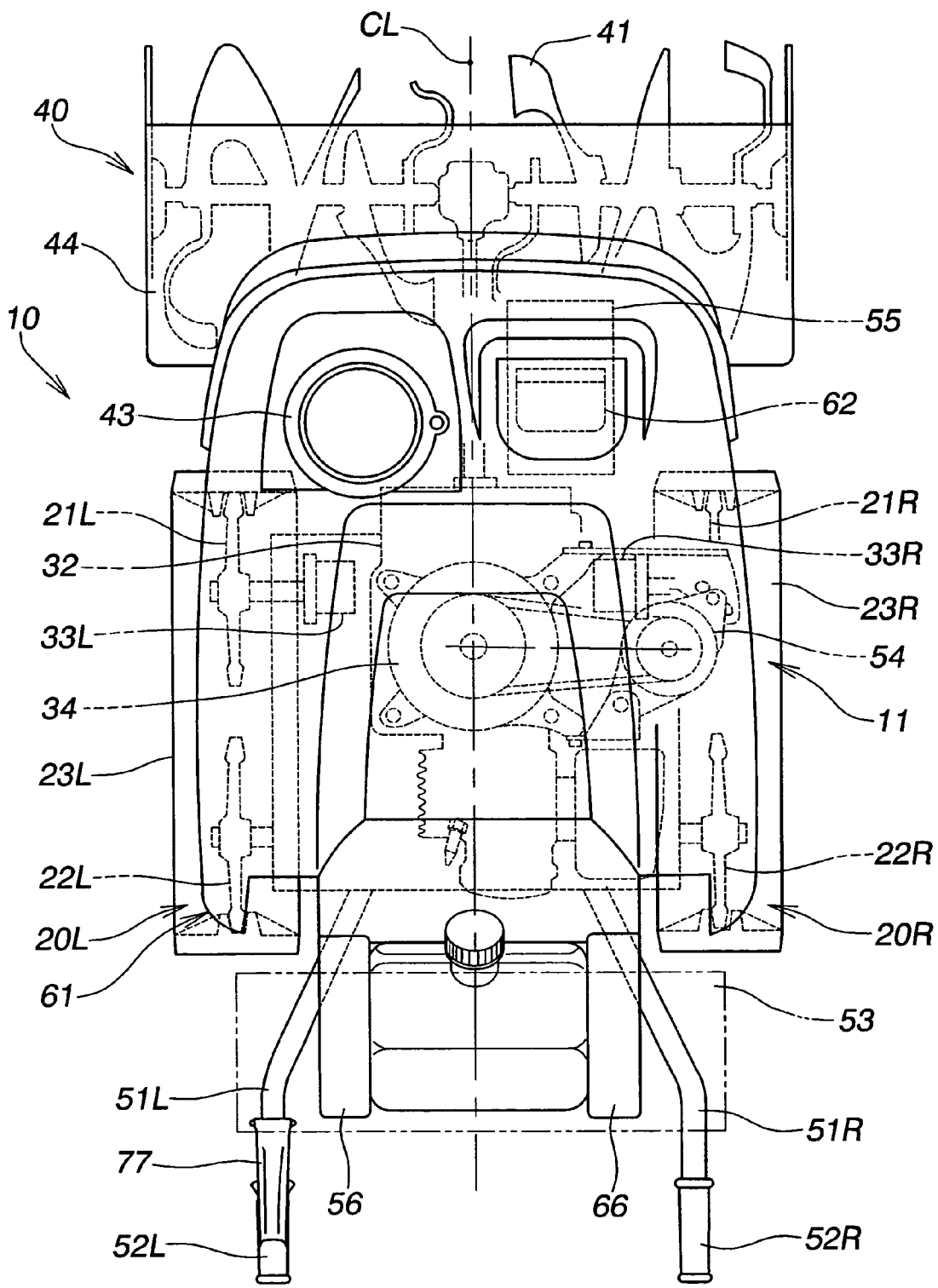
FIG. 2 is a plan view of the snow-remover shown in FIG. 1.

As shown in FIG. 1 and FIG. 2, a snow-remover 10, which is an electric vehicle, includes a machine body 11 made up of a transport frame 31 and a transmission case 32.

The transport frame 31 has left and right transporting parts 20L, 20R. The transmission case 32 is attached to the transport frame 31 in such a way that it can swing up and down. Left and right electric motors 33L, 33R are mounted on left and right side parts of the transmission case 32. An engine 34 is mounted on an upper part of the transmission case 32. A snow-removal working part 40 is mounted on the front of the transmission case 32. Left and right operating handles 51L, 51R extend upward and rearward from the top of the transmission case 32. A control panel 53 is provided between the left and right operating handles 51L, 51R.

The snow-remover 10 is a self-propelled, walking-type working machine whose operator walks behind the control panel 53.

The left and right operating handles 51L, 51R have grips 52L, 52R at their ends to be gripped by hands.

It is a characteristic feature of the snow-remover 10 of this invention that the snow-removal working part 40 is driven by the engine 34 and the transporting parts 20L, 20R are driven by the electric motors 33L, 33R. This approach is adopted on the basis of the idea that for control of travel speed, turning control and forward-reverse switching control electric motors are preferable, whereas for the working parts, which are subject to sharp load fluctuations, a more powerful internal combustion engine is appropriate.

The left and right electric motors 33L, 33R are drive sources for propulsion, for driving the left and right transporting parts 20L, 20R via left and right transport transmission mechanisms 35L, 35R.

The left transporting part 20L is a crawler having a crawler belt 23L passing around a front drive wheel 21L and a rear driven wheel 22L, and rotates the drive wheel 21L forward and in reverse with the left drive motor 33L.

The right transporting part 20R is a crawler having a crawler belt 23R passing around a front drive wheel 21R and a rear driven wheel 22R, and rotates the drive wheel 21R forward and in reverse with the right electric motor 33R.

The transport frame 31 rotatably supports left and right drive wheel axles 24L, 24R and at its rear end supports a driven wheel axle 25. The left and right drive wheel axles 24L, 24R are rotating shafts to which the left and right drive wheels 21L, 21R are fixed. The driven wheel axle 25 has the left and right driven wheels 22L, 22R rotatably attached to it.

The engine 34 is a vertical engine having a crankshaft 34a extending downward, and is a for-working drive source for driving the snow-removal working part 40 by transmitting a driving force thereto via a for-working transmission mechanism housed in the transmission case 32.

The snow-removal working part 40 is made up of an auger 41 at the front, a blower 42 at the rear, a shooter 43 at the top, an auger housing 44 covering the auger 41, and a blower housing 45 covering the blower 42. The auger 41 has an action of collecting snow piled on the ground to the center. The blower 42 receives this snow and blows the snow through the shooter 43 to a desired position beside the snow-remover 10.

A swing drive mechanism 46 adjusts the attitude of the auger housing 44 by swinging the transmission case 32 and the snow-removal working part 40 up and down.

As shown in FIG. 2, The machine body 11 has generator 54 and a battery 55 mounted at its front.

In this way, the snow-remover 10 has a working part 40, such as a snow-removing part, on a machine body 11; an engine 34 for driving this working part 40; transporting parts 20L, 20R made up of crawlers and wheels; electric motors 33L, 33R for driving these transporting parts 20L, 20R; a generator 54, driven by the engine 34, for supplying electrical power to a battery 55 and the electric motors 33L, 33R; and a control part 56 for controlling the rotation of the electric motors 33L, 33R. The control part 56 is for example disposed below the control panel 53 or built into the control panel 53.

In the drawings, the reference number 61 denotes a cover covering the engine 34; 62 a lamp; 63 an air cleaner; 64 a carburetor; 65 an engine exhaust muffler; and 66 a fuel tank.

Figure 3:
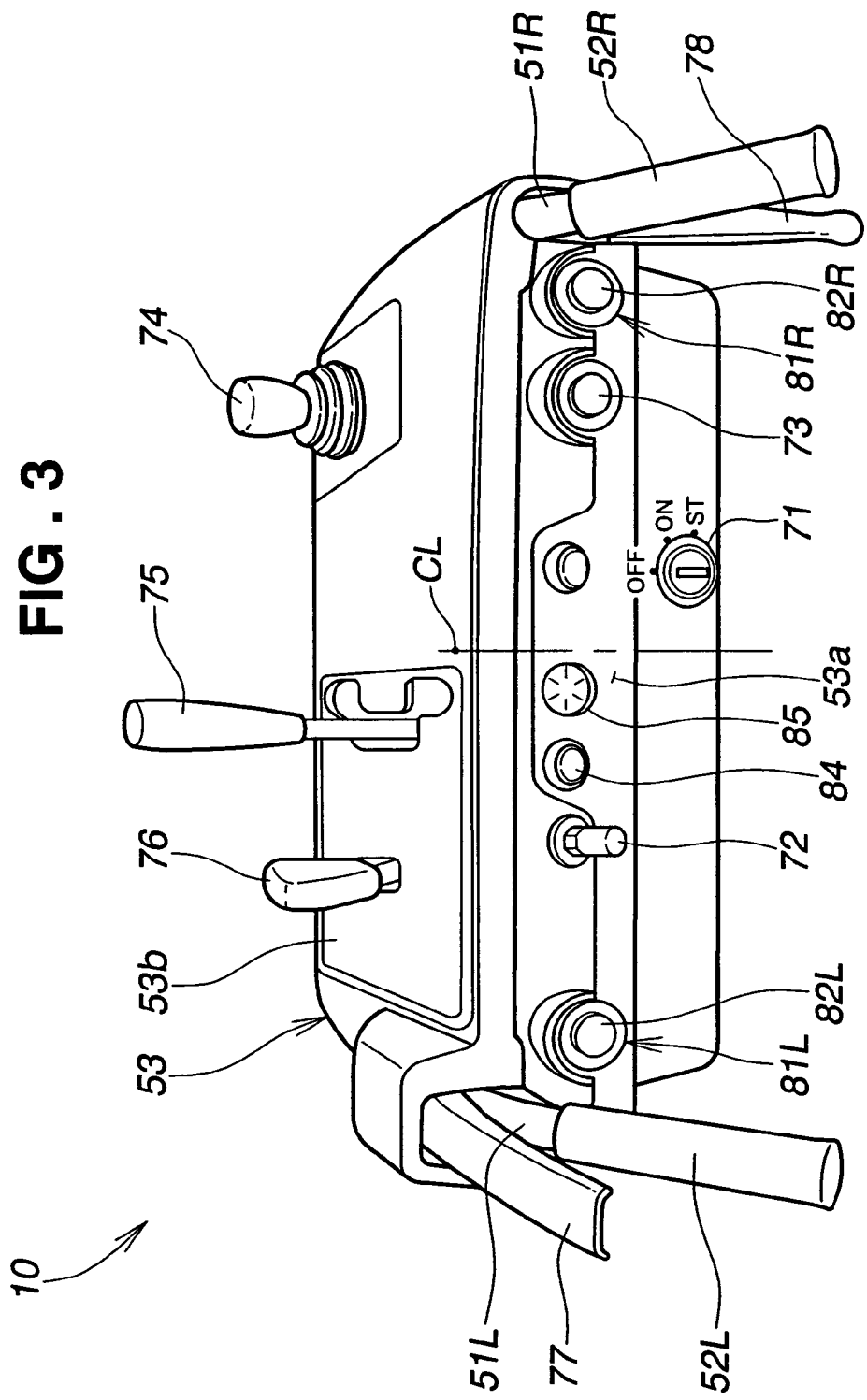
FIG. 3 is a view in the direction of the arrow 3 in FIG. 1.

As shown in FIG. 3, the control panel 53 has on a rear face 53a thereof (the face on the operator side) a main switch 71, an engine switch 72 and a clutch operating switch 73. On the top face 53b of the control panel 53 are provided, in order from the right side to the left side, a snow-throwing direction adjusting lever 74, a direction/speed lever 75 serving as a direction/speed control member pertaining to the transporting part, and an engine throttle lever 76. Also, the grip 52L is disposed to the left of the control panel 53 and the grip 52R is disposed to the right of the control panel 53.

The left operating handle 51L has a travel preparation lever 77 near to the grip 52L. The right operating handle 51R has an auger housing attitude adjusting lever 78 near to the grip 52R.

Referring to FIG. 1 and FIG. 3, the main switch 71 is an ordinary ignition switch with which it is possible to start the engine 34 by inserting a main key (not shown) into a key insertion hole and turning it, and for example an 'off position OFF', an 'on position ON' and a 'start position ST' are arranged in order clockwise around the key insertion hole.

When the main key is turned to the off position OFF, the engine 34 is stopped and the entire electrical system is shut down. When the main key is turned from the off position OFF to the on position ON, the engine 34 is kept in a stopped state. When the main key is turned to the start position ST, the engine 34 is started. When the main key is turned from the start position ST to the on position ON, the started engine 34 shifts to normal running.

An engine choke 72 is a control member that raises the concentration of the fuel-air mixture when pulled. The dutch operating switch 73 is a push-button switch for turning on and off the auger 41 and the blower 42, that is, a switch for on/off-controlling the snow-removal working part 40. Hereinafter, the clutch operating switch 73 will for convenience be referred to as 'the auger switch 73'.

The snow-throwing direction adjusting lever 74 is a lever operated to change the direction of the shooter 43.

The direction/speed lever 75 is a forward/reverse speed adjusting lever for controlling the travel speed of the electric motors 33L, 33R and switching between forward and reverse by controlling the direction of rotation of the electric motors 33L, 33R.

Figure 4:
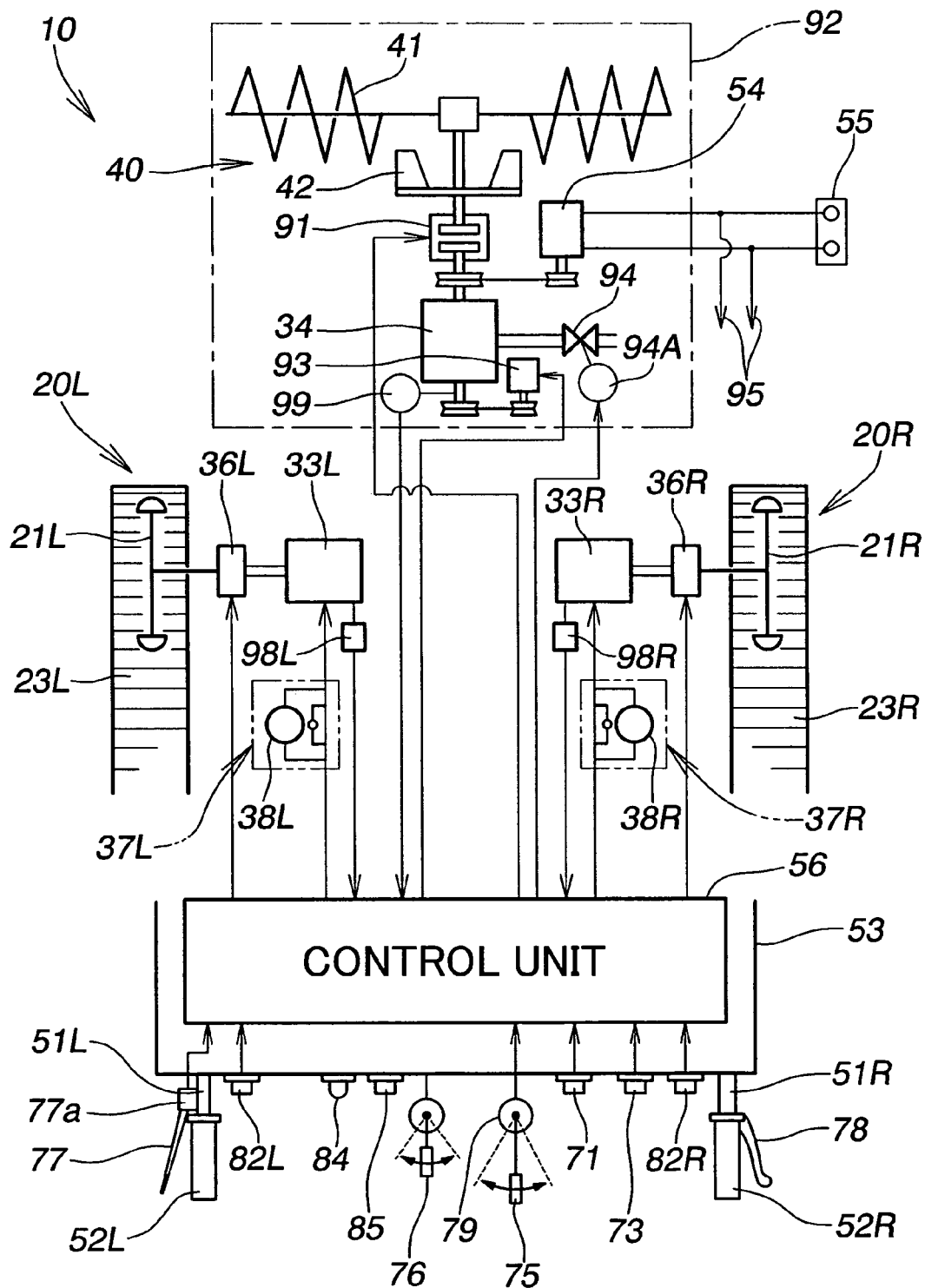
FIG. 4 is a schematic view of the electrical system of the snow-remover shown in FIG. 1.

The engine throttle lever 76 controls the speed of the engine 34 by adjusting the aperture of a throttle valve (see reference number 94 in FIG. 4).

The travel preparation lever 77 is a travel preparation member that acts on switching means (see reference numeral 77a in FIG. 4) and turns the switching means off under a pulling action of a return spring when in the free state shown in the figure. When the left hand of the operator grips the travel preparation lever 77 and moves it toward the grip 52L, the switching means turns on. In this way, the switching means detects whether or not the travel preparation lever 77 is being gripped.

The auger housing attitude adjusting lever 78 is a lever operated to control the swing drive mechanism 46 to change the attitude of the auger housing 44.

Also on the control panel 53, between the left and right operating handles 51L, 51R and located so that they can be operated by hands gripping these left and right operating handles 51L, 51R, left and right turn control switches 81L, 81R are provided.

The left turn control switch 81L consists of a push-button switch and has a left brake button 82L (left brake control member) facing rearward (toward the operator) from the snow-remover 10. This left turn control switch 81L is an automatically returning contact switch that switches on and produces a switch signal only as long as the left brake button 82L is being pressed.

The right turn control switch 81R consists of a push-button switch and has a right brake button 82R (right brake control button) facing rearward (toward the operator) from the snow-remover 10. This right turn control switch 81R is an automatically returning contact switch that switches on and produces a switch signal only as long as the right brake button 82R is being pressed.

Specifically, of the rear face 53a of the control panel 53, the left turn control switch 81L and its left brake button 82L are disposed near the left grip 52L in a position on the machine width center CL side thereof. And of the rear face 53a of the control panel 53, the right turn control switch 81R and its right brake button 82R are disposed near the right grip 52R and in a position on the machine width center CL side thereof.

When the operator grips the left and right operating handles 51L, 51R with both hands, the thumbs of both hands are on the inner sides (the machine width center CL sides) of the operating handles 51L, 51R.

When while gripping the left and right operating handles 51L, 51R with both hands and steering the snow-remover 10 the operator extends the thumb of the left hand forward and pushes the left brake button 82L of the left turn control switch 81L while still gripping the operating handles 51L, 51R, for as long as the left brake button 82L is pressed the snow-remover 10 turns to the left. And for as long as the operator extends the thumb of the right hand forward and presses the right brake button 82R of the right turn control switch 81R, the snow-remover 10 turns to the right.

In this way, without removing the hands from the left and right operating handles 51L, 51R, it is possible to perform a turning maneuver extremely easily with a small operating force.

Because the left and right turn control switches 81L, 81R, which operate regenerative braking circuits (see reference numerals 38L, 38R of FIG. 4) serving as turning mechanisms, are provided between the left and right operating handles 51L, 51R on the control panel 53 and located so that they can be operated by hands gripping these left and right operating handles 51L, 51R, while gripping the left and right operating handles 51L, 51R with both hands and steering the snow-remover 10 (see FIG. 1) the operator can also operate the left and right turn control switches 81L, 81R with thumbs still gripping the operating handles 51L, 51R. Accordingly, it is not necessary to swap grips of the operating handles 51L, 51R or to remove the hands from the operating handles 51L, 51R each time the snow-remover 10 is left-turned or right-turned. Consequently, the steerability of the snow-remover 10 increases.

Also, an information display 84 and a sounder 85 serving as annunciators are further provided on the rear face 53a of the control panel 53.

The information display 84 is a part for displaying information on the basis of a command signal from the control part 56, and for example consists of a liquid crystal display panel or display lights. The sounder 85 is a part for producing a sound on the basis of a command signal from the control part 56, and for example consists of a buzzer for producing a report sound or a speech generator for producing speech.

FIG. 4 is a control diagram of a snow-remover according to the invention. The engine 34, an electromagnetic clutch 91, the auger 41 and the blower 42 constitute a working part system 92, and the rest constitutes a transporting part system.

First, the operation of the snow-removal working part 40 will be described.

When the key is inserted into the main switch 71 and turned to the start position ST shown in FIG. 3, a cell motor (starter) 93 turns and the engine 34 starts.

The engine throttle lever 76 adjusts the aperture of a throttle valve 94 by way of a throttle wire (not shown), and thereby controls the speed of the engine 34.

Also, the throttle aperture of the throttle valve 94 is automatically controlled by way of a valve driving part 94A in accordance with a control signal from the control part 56. In the throttle valve 94, the aperture control of the valve driving part 94A takes priority over aperture control with the engine throttle lever 76.

Some of the output of the engine 34 rotates the generator 54, and the electrical power obtained is supplied to the battery 55 and the left and right electric motors 33L, 33R. The remainder of the output of the engine 34 drives the auger 41 and the blower 42 via the electromagnetic clutch 91. Electrical power is supplied to the left and right electric motors 33L, 33R and other electrical components from the generator 54 and the battery 55 via a harness 95.

The reference numerals 98L, 98R denote sensors for detecting the speeds (motor speeds; rotational speeds) of the left and right electric motors 33L, 33R. The reference number 99 denotes a sensor for detecting the speed (rotational speed) of the engine 34.

When the travel preparation lever 77 is gripped and the clutch operating switch 73 is operated, the electromagnetic clutch 91 is engaged and the auger 41 and the blower 42 are rotated by motive power from the engine 34. When the travel preparation lever 77 is released, or when the clutch operating switch 73 is pressed again, the electromagnetic clutch 91 disengages.

Next, the operation of the transporting parts 20L, 20R will be explained.

The snow-remover 10 of this invention has left and right electromagnetic brakes 36L, 36R which are equivalent to a vehicle parking brake. Specifically, the motor shafts of the left and right electric motors 33L, 33R are braked by the left and right electromagnetic brakes 36L, 36R. While the snow-remover 10 is parked, these electromagnetic brakes 36L, 36R are in a braking state under the control of the control part 56. The electromagnetic brakes 36L, 36R are released by the procedure explained below.

When the two conditions of the main switch 71 being in its ON position and the travel preparation lever 77 being gripped are satisfied, if the direction/speed lever 75 is switched to forward or reverse, the electromagnetic brakes 36L, 36R assume a released (non-braking; OFF) state.

Figure 5A:
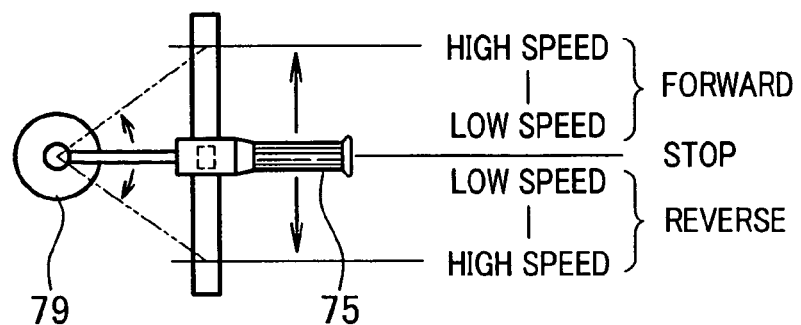
FIG. 5A shows operating positions of a direction/speed lever shown in FIG. 3, and FIG. 5B and FIG. 5C are graphs showing output voltage values of an accelerator potentiometer corresponding to positions of the direction/speed lever.

As shown in FIG. 5A, the direction/speed lever 75 can move back and forth as shown with arrows and is controllable to a forward range, a stop position, and a reverse range. In the forward range and in the reverse range, it can be switched continuously from a low speed to a high speed. The position of this direction/speed lever 75 is monitored with an accelerator potentiometer 79.

The reference numerals 37L, 37R denote motor drivers, and these include the regenerative braking circuits 38L, 38R (FIG. 4).

Figure 5B:
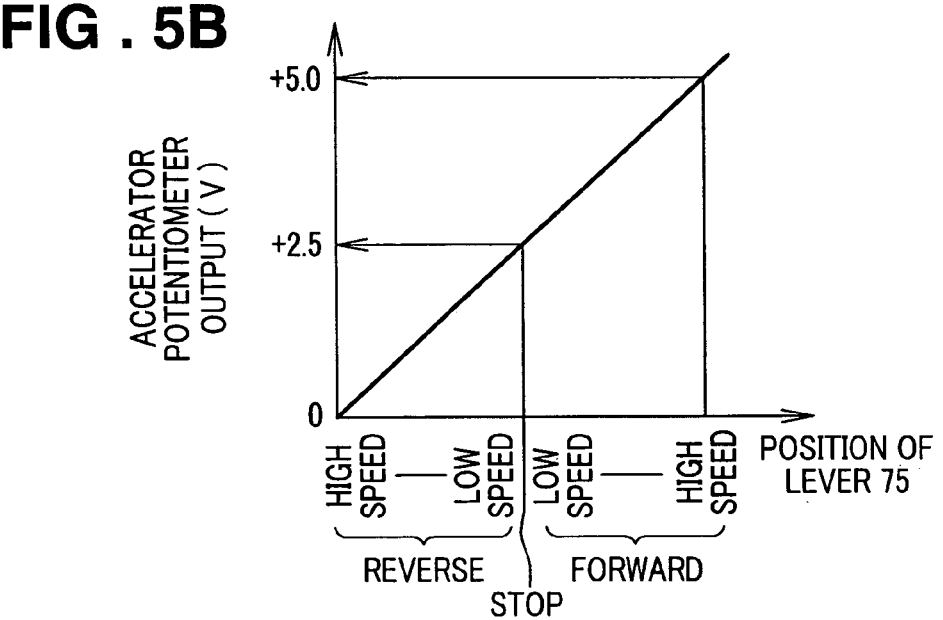

FIG. 5B is a graph showing the relationship between the position of the direction/speed lever 75 and the output voltage of the accelerator potentiometer 79. When the output range of the accelerator potentiometer 79 is made 0 to +5V (Volts), a reverse high speed is allocated to 0V, neutral (stop) to +2.5V and a forward high speed to +5V.

Figure 5C:
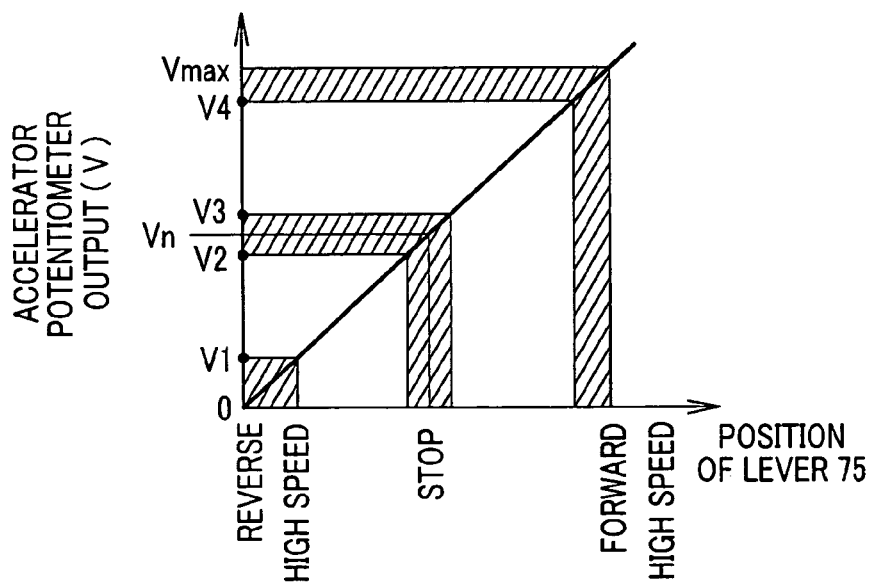

FIG. 5C is a graph obtained by adapting the graph shown in FIG. 5B for the control of the present preferred embodiment. Reverse High Speed (horizontal axis) has been made 0V (vertical axis); Stop (horizontal axis) has been made Vn (vertical axis), which is a neutral voltage; and Forward High Speed (horizontal axis) has been made Vmax (vertical axis).

Now, when the driver has set the direction/speed lever 75 in the vicinity of Forward High Speed, because it is the wish of the driver to invoke a forward high speed, the control carried out in this preferred embodiment is not applied. That is, the range V4 to Vmax (shown with hatching) in FIG. 5C is a non-control range.

Similarly also when the driver has set the direction/speed lever 75 in the vicinity of Reverse High Speed, because it is the wish of the driver to invoke a reverse high speed, the control carried out in this preferred embodiment is not applied. That is, the range 0 to V1 (shown with hatching) in FIG. 5C is a non-control range.

Also, when the driver has set the direction/speed lever 75 to Stop or to a very low speed, because it is the wish of the driver to invoke Stop or a very low speed, the control carried out in this preferred embodiment is not applied. That is, the range V2 to V3 (shown with hatching) in FIG. 5C is a non-control range.

That is, in FIG. 5C the control of this preferred embodiment is carried out in the ranges V1 to V2 and V3 to V4.

Figure 6A:
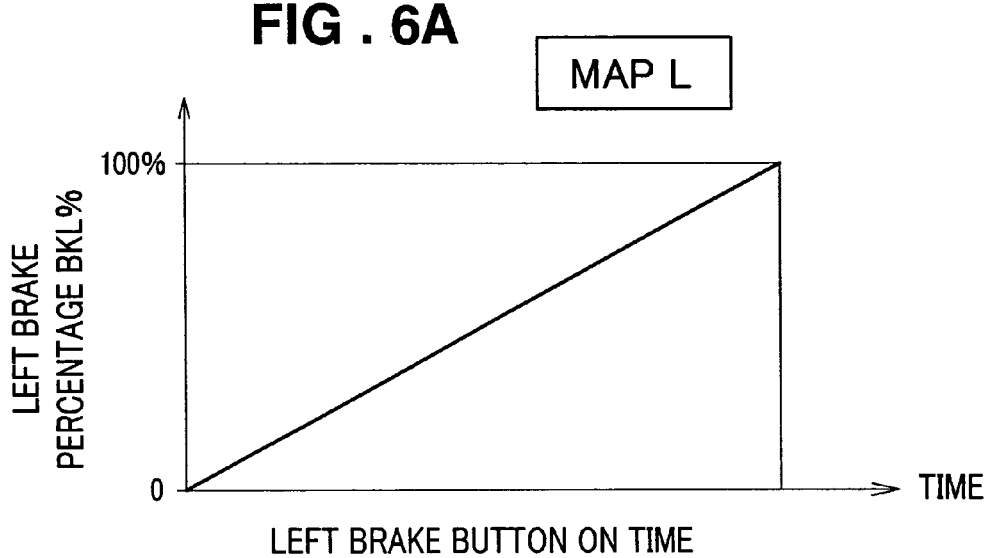
FIG. 6A and FIG. 6B are maps showing brake percentages with respect to ON times of brake buttons used in the invention.

FIG. 6A is a 'map L' showing the relationship between the ON time of the left brake button 82L and a left brake percentage BKL %.

Immediately after the operator presses the left brake button 82L, because the ON time is near the origin, the BKL % is approximately zero. When the left brake button 82L continues to be pressed, the BKL % increases to a maximum of 100% in proportion (first order function) with the ON time. This map L is stored in a memory part of the control part 56. The control part 56 determines a left brake percentage BKL % by reading out the BKL % corresponding to the ON time of the left brake button 82L.

Figure 6B:
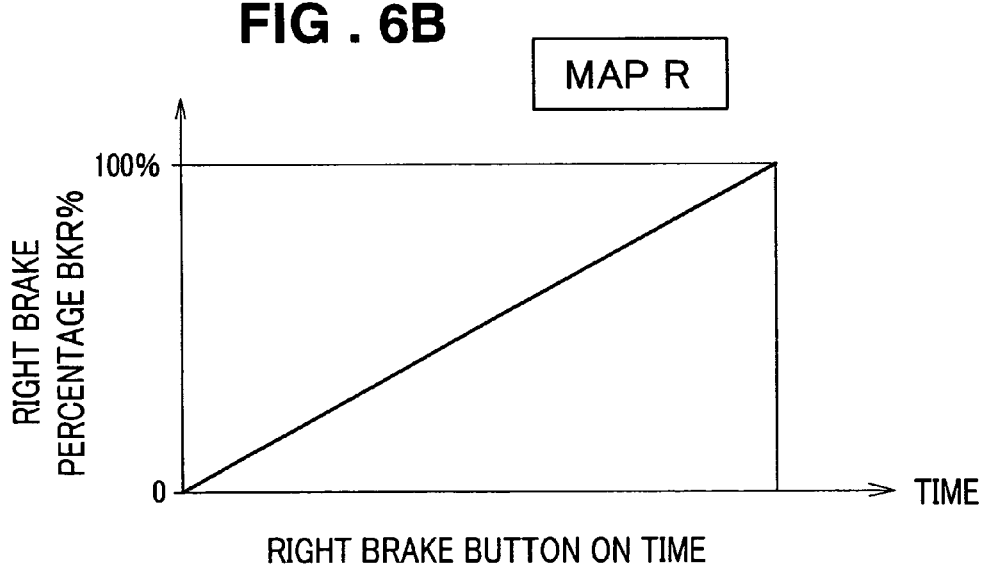

FIG. 6B is a 'map R' for the right brake button 82R, and since the content and usage of the map are the same as those of FIG. 6A they will not be explained again.

And although in this preferred embodiment an example wherein the map L and the map R are in graph form has been shown to facilitate understanding, alternatively they may be stored in the control part in the form of first order functions.

Although in this preferred embodiment a map L and a map R have been shown for convenience, alternatively a single map or functional expression may be used for both the left and right brakes.

In this preferred embodiment a first order function is employed. The reason for this is that when a second order function or a higher order function is used, the storage area and the load on the computing part in the control part 56 increase, and it becomes necessary to equip the control part 56 with a high-bit, high-byte computing part. If a first order function is used, on the other hand, a cheap computing part will suffice, and the control part 56 can be made more compact and lower in cost.

Next, speed-reduction control of the left and right electric motors according to the invention will be explained, on the basis of the flow chart shown in FIG. 7A to FIG. 7D.

Figure 7A:
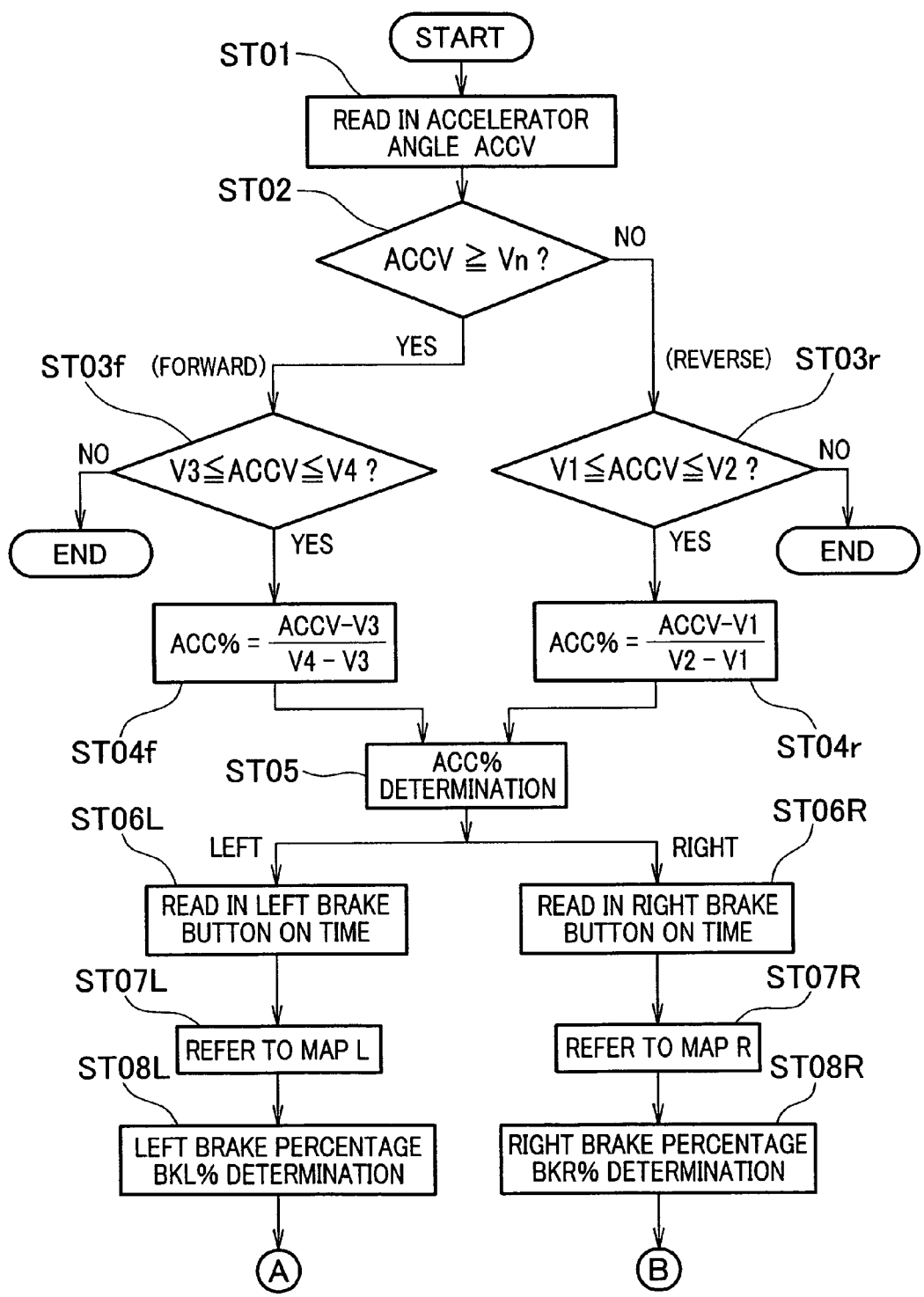
FIG. 7A through FIG. 7D are flow charts for performing speed-reduction control of the invention.

First, in FIG. 7A, step (hereinafter abbreviated to ST) 01: An accelerator angle ACCV corresponding to the output voltage of the accelerator potentiometer 79 shown in FIG. 5A is read in.

ST02: It is determined whether or not the accelerator angle ACCV read in is above the neutral voltage Vn shown in FIG. 5C. If it is above the neutral voltage Vn, it is inferred that the vehicle is in 'Forward', and processing proceeds to ST03$f$. When the accelerator angle ACCV is below the neutral voltage, it is inferred that the vehicle is in 'Reverse' and processing proceeds to ST03$r$.

ST03$f$: It is determined whether or not the accelerator angle ACCV is in the voltage range V3 to V4 shown in FIG. 5C. When the accelerator angle ACCV is in the voltage range V3 to V4, it is inferred that the vehicle is in a controllable range, and processing proceeds to ST04$f$. Otherwise, the vehicle is in a non-controllable range, and processing ends.

ST04$f$: If the accelerator angle ACCV is in the voltage range V3 to V4, the proportion of ACCV in this range (an accelerator percentage ACC %) is calculated. The formula for the calculation is accelerator percentage ACC %= (ACCV−V3)/(V4−V3).

ST03$r$: If the determination in ST02 is NO, it is determined whether or not the accelerator angle ACCV is in the voltage range V1 to V2 shown in FIG. 5C. If it is in the voltage range V1 to V2 then it is inferred that the vehicle is in a controllable range and processing proceeds to ST104$r$. Otherwise the vehicle is in a non-controllable range and processing ends.

ST04$r$: If the accelerator angle ACCV is in the voltage range V1 to V2, the proportion of ACCV in this range (an accelerator percentage ACC %) is calculated. The formula for the calculation is accelerator percentage ACC %= (ACCV−V1)/(V2−V1).

ST05: From ST04$f$ or ST04$r$, an accelerator percentage ACC % is determined.

ST06L: The ON time of the left brake button 82L is read in.

ST07L: Reference is made to the map L shown in FIG. 6A.

ST08L: From the ON time of the left brake button 82L and the map L, a left brake percentage BKL % is determined.

And similarly for the right brake, the following steps are executed.

ST06R: The ON time of the right brake button 82R is read in.

ST07R: Reference is made to map R of FIG. 6B.

ST08R: From the ON time of the right brake button 82R and the map R, a right brake percentage BKR % is determined.

The flow chart shown in FIG. 7B will now be explained.

ST09L: On the basis of the Vmax shown in FIG. 5C, the ACC % determined in ST05 of FIG. 7A and the BKL % calculated in ST08L, the following calculation is carried out. TG1L=Vmax×ACC %×(1−BKL %).

When the left brake percentage BKL % is large, it is wasteful to feed a large voltage to the left electric motor 33L, and it is desirable to cut down the power supplied to the left electric motor 33L.

When the left brake percentage BKL % is large, BKL % takes a large value near to 1.0, and (1−BKL %) takes a small value near to 0. By multiplying this (1−BKL %) by (Vmax×ACC %) it is possible to set an amended accelerator angle that takes into account the left brake percentage.

It is advantageous to take into account the left brake percentage like this when determining the voltage at which the left electric motor 33L is controlled. However, if the right brake percentage is large, it is desirable for the control voltage of the left electric motor 33L to be lowered still further. If the right brake percentage is small, its influence on the left electric motor 33L can be ignored.

It is more desirable to take into account both the left brake percentage and the right brake percentage like this when determining the voltage at which the left electric motor 33L is controlled.

So, the idea of replacing the BKL % in the last term of ST09L with (BKL %+p×BKR %×ACC %) will be considered. BKR % is the right brake percentage.

When considering the left electric motor 33L, it seems likely that the influence of the right brake percentage will be more significant the larger is the accelerator percentage ACC %. So, the right brake percentage BKR % is multiplied by ACC %. And because when BKR % is directly added to BKL % the influence of the right brake percentage BKR % is too strong, it is multiplied by a coefficient p of about 0.3 to 0.5.

It can be seen that it is then appropriate to replace the BKL % in the last term of ST09L with (BKL %+p× BKR %×ACC %). This (BKL %+p×BKR %×ACC %) will be called the first left corrected brake percentage.

ST10L: An amended value TG2L (left motor control value) of TG1L is calculated using the following formula. TG2L=Vmax×ACC %×{1−(BKL %+p×BKR %×ACC %)}.

ST11L: Because a left motor control value TG2L has been determined, the left electric motor 33L is driven in accordance with this TG2L.

Because ST09R and ST10R are the same as ST09L and ST10L with R replaced with L, their description will be omitted.

ST11R: Because a right motor control value TG2R has been determined, the right electric motor 33R is driven in accordance with this TG2R.

If the left and right electric motors 33L, 33R are controlled on the basis of the flow described above, it becomes unnecessary to supply the left and right electric motors with unnecessary electric power, and electrical energy can be saved in the electric vehicle.

Figure 7B:
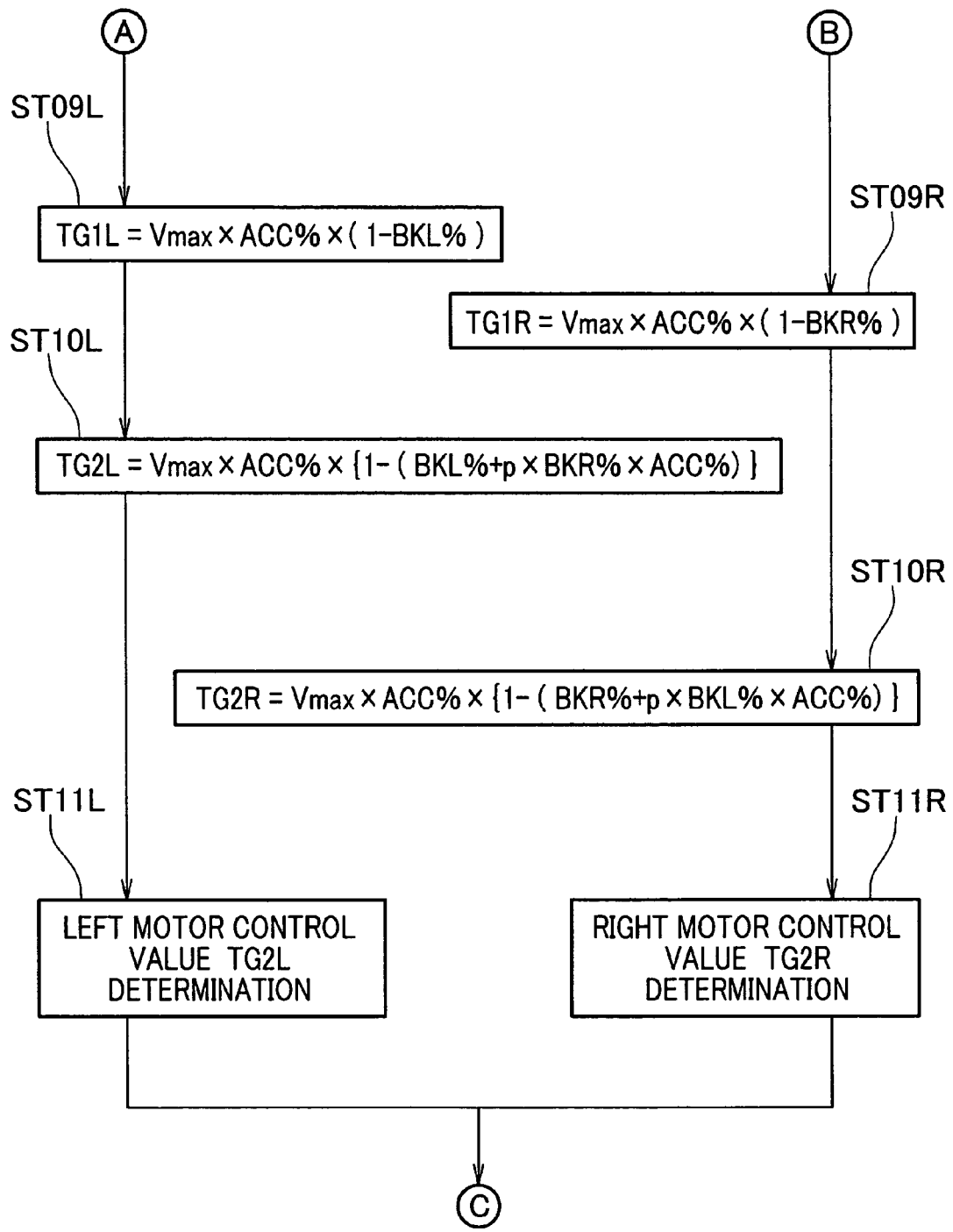
Figure 7C:
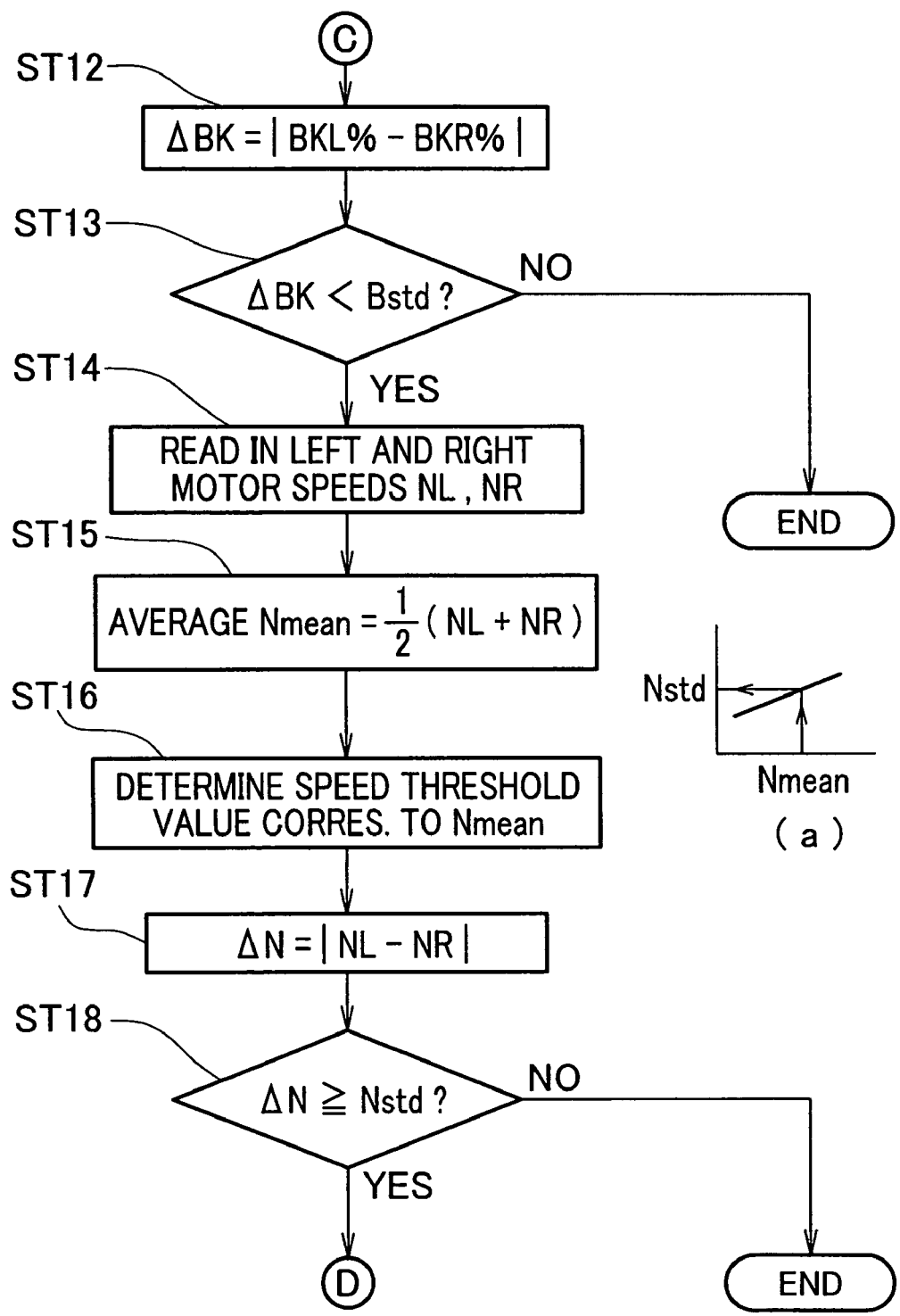

ST12 in FIG. 7C: To investigate whether or not there is a need for straight-line control during normal running, first a brake difference ΔBK (=|BKL %−BKR %|) is calculated. BKL % is the left brake percentage determined in ST08L of FIG. 7A, and BKR % is the right brake percentage determined in ST08R of FIG. 7A.

ST13: For investigating whether the left and right brake percentages are essentially the same, a brake difference threshold value Bstd at which it can be regarded that the left and right brake percentages are substantially the same is predetermined. Then, it is checked whether or not the brake difference ΔBK determined in ST12 is less than the brake difference threshold value Bstd. If NO, then there is a difference between the left and right brake percentages and this processing ends.

ST14: If in ST13 the determination is YES then the left and right brake percentages are the essentially the same, and to move control on, left and right electric motor speeds NL, NR (detected with the speed sensors 98L, 98R in FIG. 4) are read in.

ST15: The average Nmean of the left and right electric motor speeds NL, NR is calculated.

ST16: A speed threshold value Nstd corresponding to the average Nmean obtained in ST15 is determined from the graph shown in (a) in FIG. 7C. The higher the speed, the more significant is the speed difference between left and right. At low speeds, the speed difference is small. Accordingly, the threshold value used for the determination (the speed threshold value Nstd) is decided in correspondence with the speed.

ST17: A speed difference ΔN (=|NL−NR|) is calculated.

ST18: It is determined whether or not the speed difference ΔN obtained in ST17 is above the speed threshold value Nstd. If NO, then there is no great speed difference between the left and right electric motors 33L, 33R; that is, even if no action is taken there is no risk of the vehicle turning unwelcomely, and control ends. Although the brake difference was checked in ST13, the brake percentages are not completely linked to the speeds of the electric motors. Accordingly, the speed difference of the left and right electric motors 33L, 33R is checked again here.

Figure 7D:
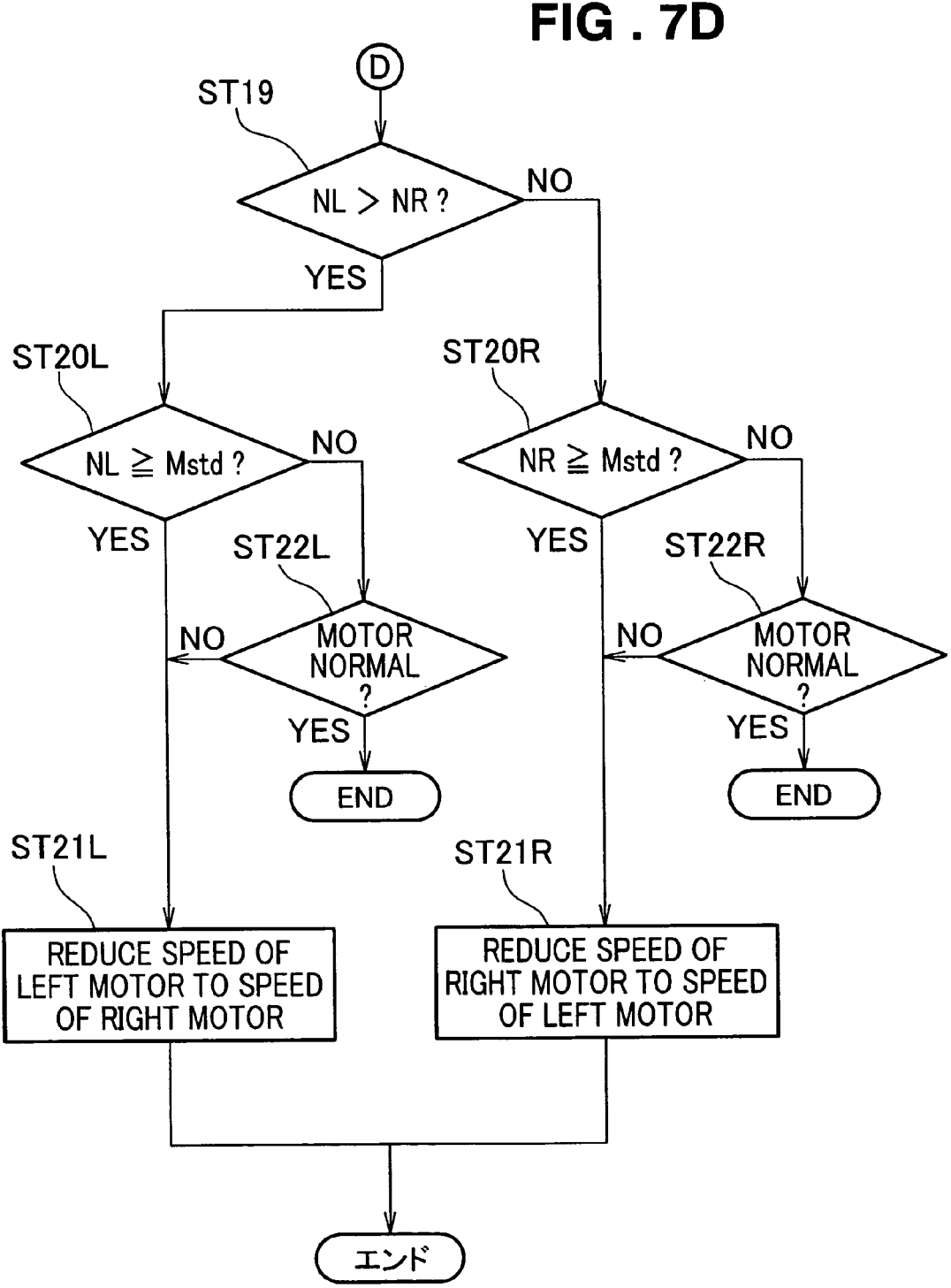

ST19 in FIG. 7D: Because it is known that there is a speed difference between the left and right electric motors 33L, 33R, it is checked which of the left and right electric motors 33L, 33R is at the higher speed. If the left electric motor 33L is at the higher speed, processing proceeds to ST20L, and if the right electric motor 33R is at the higher speed processing proceeds to ST20R.

ST20L: A motor speed threshold value Mstd equivalent to a very low speed is preset, and it is checked whether or not the speed NL of the left electric motor 33L is above the motor speed threshold value Mstd.

ST21L: Because the speed of the left electric motor 33L at the higher speed is above the motor speed threshold value Mstd, the left electric motor 33L is reduced in speed and brought to the speed of the right electric motor 33R. By this means the straight-forward driveability of the snow-remover can be maintained.

ST22L: When in ST20L the speed NL of the left electric motor 33L is less than the motor speed threshold value Mstd, in principle speed-reduction control is not carried out. However, this is not the case when there is an abnormality such as failure of an electric motor. This is because if an electric motor fails and suddenly stops, the vehicle will turn suddenly. To avoid this, in ST22L it is checked whether or not the electric motors are normal, and if they are normal processing ends and, according to the principle, 'speed-reduction control' is not implemented.

ST20R to ST22R: These are steps carried out when the speed NR of the right electric motor 33R is larger than the speed NL of the left electric motor 33L, and because the same processing is carried out as for the left electric motor 33L, their description will be omitted.

FIG. 8 shows a subroutine for ST22L and ST22R in FIG. 7D, and is a flow chart for checking whether or not the electric motors are normal.

ST31: It is checked whether or not a pulse-width modulated (hereinafter abbreviated to PWM) left PWM command value constituting a signal for controlling the speed of the left electric motor 33L is below a starting capacity. If the left electric motor 33L has failed and become locked, there is a possibility of an excessive PWM signal being produced even when the actual speed is far below the target speed, and in this step this is detected. When the left PWM command signal is below the starting capacity, processing proceeds to ST32. When the left PWM command signal is above the starting capacity, it is determined that the motor is abnormal.

ST32: At the same time, it is checked whether or not a right PWM command value is below the starting capacity.

ST33: It is checked whether or not the motor current value in the left electric motor 33L is below an allowed value. If the left electric motor 33L has failed there is a possibility of an excessive current flowing, and when a current exceeding the allowed value is flowing through the left electric motor 33L the motor is determined to be abnormal.

ST34: Similarly it is checked whether or not the current value in the right electric motor 33R is below an allowed value.

ST35: It is checked whether or not the left electric motor 33L is rotating. If the motor is stopped notwithstanding that a rotation command is being outputted to it, the motor is determined to be abnormal.

ST36: Similarly, it is checked whether or not the right electric motor 33R is rotating.

In this way, if all of the results in ST31 to ST36 are YES then the electric motors are normal, but if even one is not then the respective motor is regarded as abnormal.

When it has been determined that one of the left and right electric motors 33L, 33R is abnormal, processing proceeds to ST21L or ST21R in FIG. 7D and the left or right electric motor 33L or 33R is swiftly slowed down and then stopped, and the failure is investigated.

Figure 9A:
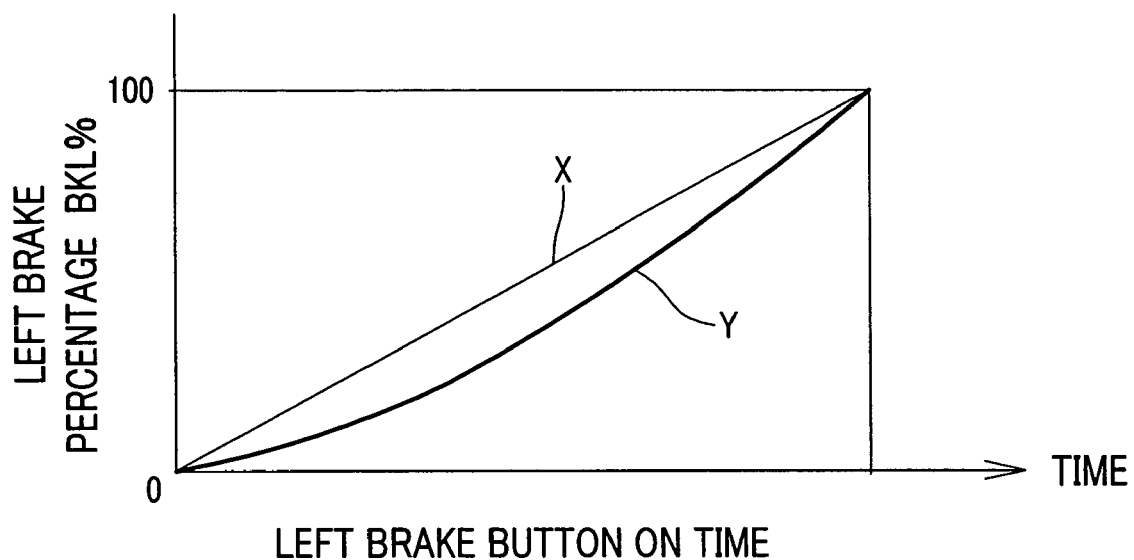
FIG. 9A and FIG. 9B are graphs illustrating another preferred embodiment of obtaining brake percentages.
Figure 9B:
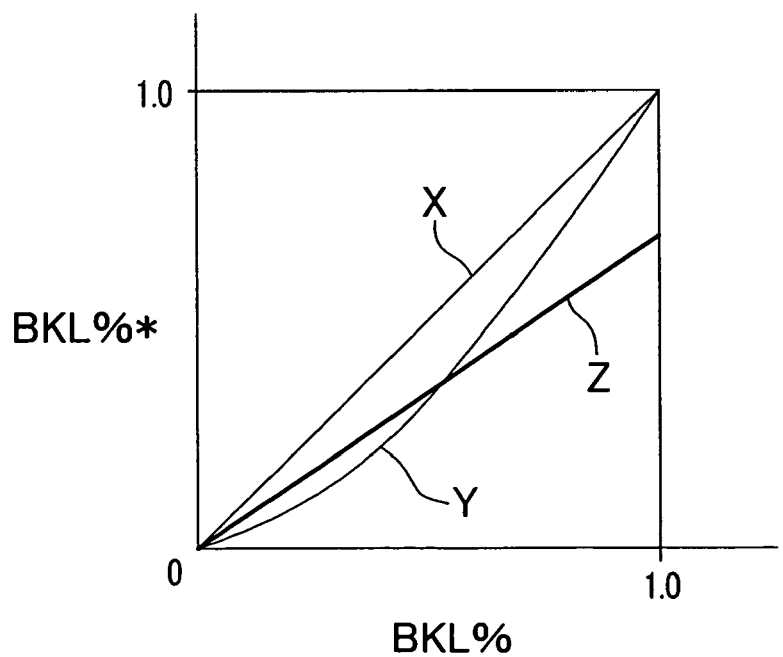

FIG. 9A and FIG. 9B show other preferred embodiments of the graphs for obtaining brake percentages shown in FIGS. 6A and 6B.

In FIG. 6A, a straight line X passing through the origin is used for the calculation.

On the other hand, as shown in FIG. 9A, when deceleration phenomena that accompany braking are considered, it is desirable that braking be carried out gently at first and then the deceleration be increased, and a second order curve Y is preferable. However, the use of a second order curve Y is problematic from the point of view of cost.

FIG. 9B is a graph for correcting the left brake percentage BKL %, in which the vertical axis shows a second left corrected brake percentage BKL %* (different from first and third left corrected brake percentages mentioned above and below). The straight line X before correction is expressed as BKL %*=BKL %, of which the gradient is +1. On the other hand, the curve Y is a curve that is convex downwardly from the straight line X. Therefore, if a straight line Z with a positive gradient smaller than +1 is drawn, where BKL % is small this straight line Z approximates to the curve Y. That is, by using the straight line Z it is possible to make the initial braking gentle.

The gradient of the straight line Z will now be considered. If the accelerator percentage ACC % is large, because the vehicle speed becomes high, braking shock becomes marked. To moderate this braking shock it is necessary to make the curve Y more downwardly convex. Conversely, when the accelerator percentage ACC % is small and the vehicle speed is low, the braking shock is small and there is less need to moderate this braking shock, so the curve Y can be brought closer to the straight line X.

From the above, it is optimal for the straight line Z to be expressed as BKL %*=(1−q×ACC %)BKL %, where q is a coefficient. If ACC % is large, the gradient of the straight line Z is much smaller than 1. If ACC % is small, the gradient of the straight line Z approaches 1.

Control employing this BKL %*=(1−q×ACC %)BKL % will now be described on the basis of the flow chart shown in FIG. 10.

Figure 10:
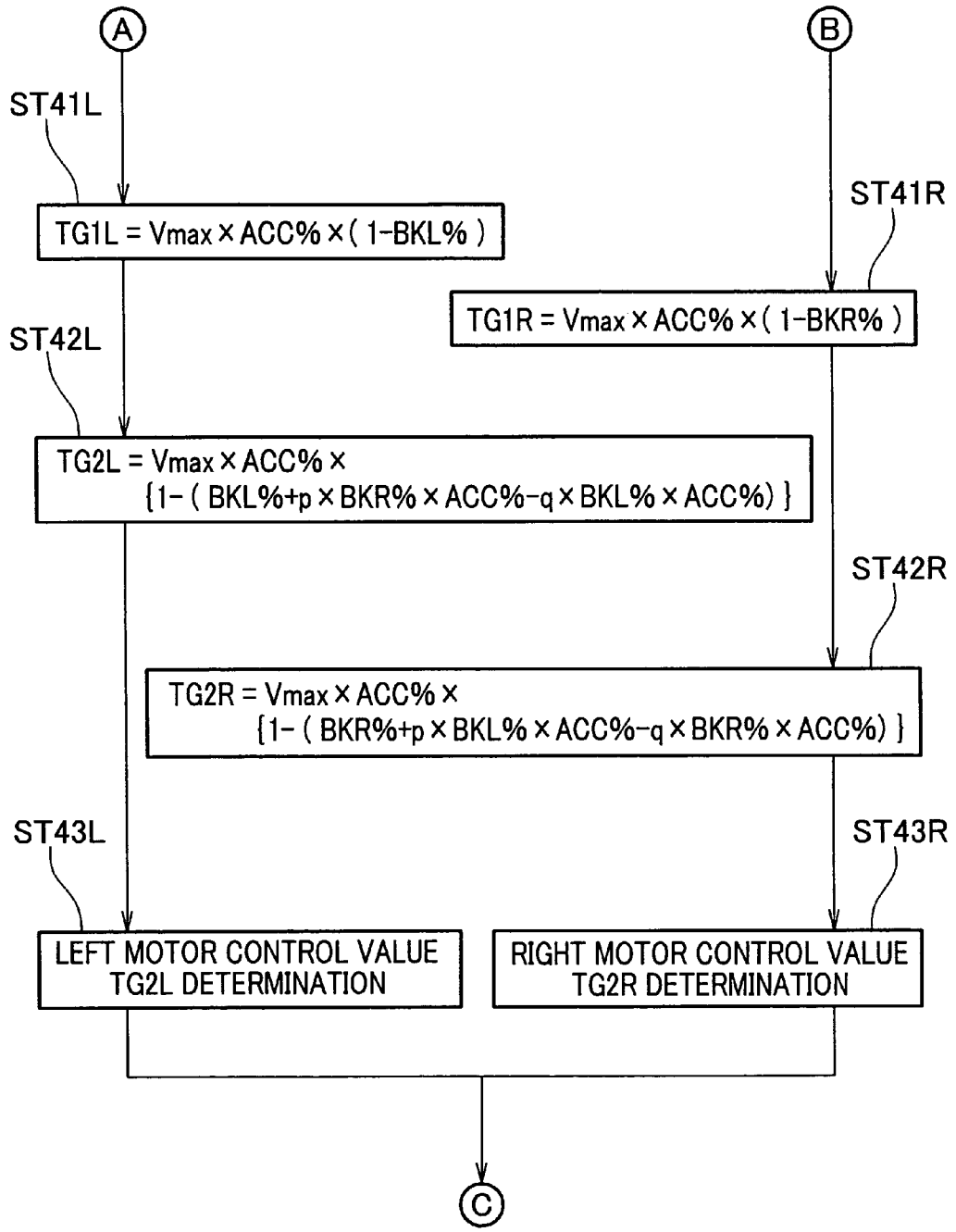
FIG. 10 is a flow chart showing another preferred embodiment of obtaining motor control values shown in FIG. 7B.

FIG. 10 shows another preferred embodiment of obtaining the motor control values shown in FIG. 7B.

ST41L: On the basis of the Vmax shown in FIG. 5C, the ACC % determined in ST05 of FIG. 7A and the BKL % calculated in ST08L, the following calculation is carried out. TG1L=Vmax×ACC %×(1−BKL %).

When the left brake percentage BKL % is large, it is wasteful to feed a large voltage to the left electric motor 33L, and it is desirable to cut down the power supplied to the left electric motor 33L.

When the left brake percentage BKL % is large, BKL % takes a large value near to 1.0, and (1−BKL %) takes a small value near to 0. By multiplying this (1−BKL %) by (Vmax×ACC %) it is possible to set an amended accelerator angle that takes into account the left brake percentage.

It is advantageous to take into account the left brake percentage like this when determining the voltage at which the left electric motor is controlled. However, if the right brake percentage is large, it is desirable for the control voltage of the left electric motor 33L to be lowered still further. If the right brake percentage is small, its influence on the left electric motor 33L can be ignored.

It is more desirable to take into account both the left brake percentage and the right brake percentage like this when determining the voltage at which the left electric motor is controlled.

So, the idea of replacing the BKL % in the last term of ST41L with (BKL %+p×BKR %×ACC %−q×BKL %×ACC %) will be considered. BKR % is the right brake percentage.

When considering the left electric motor, it seems likely that the influence of the right brake percentage will be more significant the larger is the accelerator percentage ACC %. So, the right brake percentage BKR % is multiplied by ACC %. And because when BKR % is directly added to BKL % the influence of the right brake percentage BKR % is too strong, it is multiplied by a coefficient p of about 0.3 to 0.5.

Also, as explained with reference to FIG. 9B, to employ a straight line Z as a second corrected brake percentage BKL %*, (−q×BKL %×ACC %) is added.

It can be seen that it is then appropriate to replace the BKL % in the last term of ST41L with (BKL %+p×BKR %×ACC %−q×BKL %×ACC %). This (BKL %+p×BKR %×ACC %−q×BKL %×ACC %) will be called the third left corrected brake percentage.

ST42L: A corrected value TG2L (left motor control value) of TG1L is calculated using the following formula. TG2L=Vmax×ACC %×{1−(BKL %+p ×BKR %× ACC %−q×BKL %×ACC %)}.

ST43L: Because a left motor control value TG2L has been determined, the left electric motor is driven in accordance with this TG2L, and processing continues to ST12 of FIG. 7C.

Because ST41R and ST42R are the same as the steps ST41L and ST42L for obtaining the left motor control value, their description will be omitted.

ST43R: Because a right motor control value TG2R has been determined, the right electric motor 33R is driven in accordance with this TG2R, and processing continues to ST12 of FIG. 7C.

If the left and right electric motors are controlled on the basis of the flow described above, in addition to it becoming unnecessary to supply the left and right electric motors with unnecessary electric power and electrical energy being saved in the electric vehicle, braking shock in the initial stage of braking can be greatly moderated.

Although in this preferred embodiment the example of a snow-remover was used as an example of an electric vehicle, the electric vehicle in this invention is not limited to being a snow-remover, and may alternatively be some other working vehicle such as a mower, a cultivator or a carrying vehicle.

Obviously, various minor changes and modifications of the present invention are possible in the light of the above teaching. It is therefore to be understood that within the scope of the appended claims the invention may be practiced otherwise than as specifically described.

What is claimed is:

1. A travel control method for an electric vehicle having left and right motors for independently driving respective left and right drive wheels and having left and right brakes for regulating driving speeds of the respective left and right drive wheels, comprising the steps of: independently regulating with the left and right brakes the speeds of the left and right drive wheels driven by the left and right electric motors; and performing speed-reduction control of the left and right electric motors when brake percentages of the left and right brakes are approximately equal to each other by determining the speed of each of the left and right electric motors and reducing the speed of one of the left and right electric motors being driven at a first speed to match the speed of the other of the left and right electric motors being driven at a second speed lower than the first speed; wherein reduction of the speed of the one of the left and right electric motors driven at the first speed is not carried out when a first condition, in which a difference between the first and second speeds of the left and right electric motors is below a first preselected threshold value, and a second condition, in which the first speed of the one of the left and right electric motor is below a second preselected threshold value identical or substantially equal to a low speed range of the electric vehicle, are met.

2. A travel control method according to claim 1; wherein the speed-reduction control step further comprises the step of detecting whether or not there is an abnormality in the one of the left and right electric motors driven at the first speed and, if an abnormality is detected, carrying out reduction of the speed of the one of the left and right electric motors driven at the first speed even if the first and second conditions are met.

3. A travel control method according to claim 2; wherein the reduction of the speed of the one of the left and right electric motors driven at the first speed is carried out when the first speed is higher than the second preselected threshold value.

4. A travel control method according to claim 1; wherein the reduction of the speed of the one of the left and right electric motors driven at the first speed is carried out when the first speed is higher than the second preselected threshold value.

5. A travel control method according to claim 1; wherein the speed reducing step comprises the step of reducing the speed by controlling the speed of the one of the left and right electric motors being driven at the first speed independently from the other of the left and right electric motors being driven at the second speed.

6. A travel control method, comprising the steps of:
providing an electric vehicle having a vehicle body, a pair of electric motors mounted on the vehicle body for driving a respective pair of drive wheels, a pair of brakes mounted on the vehicle body for braking the respective pair of drive wheels, and a pair of brake control members controllable between ON and OFF positions for controlling the respective pair of brakes;
obtaining a brake percentage for each of the brakes in accordance with a duration of time each of the brake control members is in the ON position;
calculating the speed of each of the electric motors; and
performing speed-reduction control of the electric motors when the brake percentages of the brakes are approximately equal to each other by reducing the speed of one of the electric motors being driven at a first speed to match the speed of the other of the electric motors being driven at a second speed lower than the first speed;
wherein reduction of the speed of the electric motor driven at the first speed is not carried out when a first condition, in which a difference between the first and second speeds is below a first preselected threshold value, and a second condition, in which the first speed is below a second preselected threshold value identical or substantially equal to a low speed range of the electric vehicle, are met.

7. A travel control method according to claim 6; wherein the step of performing speed-reduction control further comprises the step of detecting whether or not there is an abnormality in the electric motor driven at the first speed and, if an abnormality is detected, carrying out reduction of the speed of the electric motor driven at the first speed even if the first and second conditions are met.

8. A travel control method according to claim 7; wherein the reduction of the speed of the electric motor driven at the first speed is carried out when the first speed is higher than the second preselected threshold value.

9. A travel control method according to claim 6; wherein the reduction of the speed of the electric motor driven at the first speed is carried out when the first speed is higher than the second preselected threshold value.

10. A travel control method according to claim 6; wherein the electric vehicle has an auger for displacing snow and a blower for ejecting snow displaced by the auger.

11. A travel control method according to claim 6; wherein the speed is reduced by controlling the speed of the electric motor being driven at the first speed independently from the electric motor being driven at the second speed.

12. A travel control method for an electric vehicle having first and second electric motors for driving respective first and second driven wheels, comprising the steps of: calculating a speed of each of the first and second electric motors; and reducing the speed of the first electric motor to equal the speed of the second electric motor when the speed of the first electric motor is higher than the speed of the second electric motor; wherein reduction of the speed of the first electric motor is not carried out when a first condition, in which a difference between the speeds of the first and second electric motors is below a first preselected threshold value, and a second condition, in which the speed of the first electric motor is below a second preselected threshold value identical or substantially equal to a low speed range of the electric vehicle, are met.

13. A travel control method according to claim 12; wherein the reducing step includes the step of detecting whether or not there is an abnormality in the first electric motor driven and, if an abnormality is detected, carrying out reduction of the speed of the first electric motor even if the first and second conditions are met.

14. A travel control method according to claim 12; wherein the reducing step is carried out when the speed of the first electric motor is higher than the second preselected threshold value.

15. A travel control method according to claim 12; wherein the electric vehicle has an auger for displacing snow and a blower for ejecting snow displaced by the auger.

16. A travel control method according to claim 12; wherein the reducing step comprises the step of reducing the speed of the first electric motor by controlling the speed of the first electric motor independently from the second electric motor.

* * * * *